United States Patent [19]

Egashira et al.

[11] Patent Number: 6,051,654
[45] Date of Patent: *Apr. 18, 2000

[54] GOLF BALL

[75] Inventors: Yoshinori Egashira, Hidata; Hideo Watanabe; Yasushi Ichikawa, both of Yokohama, all of Japan

[73] Assignee: Bridgestone Sports Co., Ltd., Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/829,895

[22] Filed: Mar. 25, 1997

Related U.S. Application Data

[63] Continuation of application No. 08/381,392, Jan. 31, 1995, abandoned.

[30] Foreign Application Priority Data

Feb. 9, 1994 [JP] Japan .................................. 6-036521

[51] Int. Cl.$^7$ ...................................................... A63B 37/12
[52] U.S. Cl. ........................ 525/221; 525/196; 525/201; 473/365; 473/372; 473/373; 473/385
[58] Field of Search ..................................... 473/365, 372, 473/373, 385; 525/196, 201, 221

[56] References Cited

U.S. PATENT DOCUMENTS

| | | | |
|---|---|---|---|
| 3,789,035 | 1/1974 | Iwami et al. | 260/78.5 T |
| 3,819,768 | 6/1974 | Molitor . | |
| 4,346,196 | 8/1982 | Hoh et al. | 525/196 |
| 4,801,649 | 1/1989 | Statz | 525/221 |
| 4,884,814 | 12/1989 | Sullivan | 525/196 |
| 4,956,414 | 9/1990 | Muehlenbernd et al. | 525/196 |
| 5,068,151 | 11/1991 | Nakamura . | |
| 5,120,791 | 6/1992 | Sullivan | 525/196 |
| 5,298,571 | 3/1994 | Statz | 525/196 |
| 5,324,783 | 6/1994 | Sullivan | 525/221 |
| 5,328,959 | 7/1994 | Sullivan | 525/221 |
| 5,397,840 | 3/1995 | Sullivan et al. | 525/221 |
| 5,415,937 | 5/1995 | Cadorniga et al. | 525/221 |
| 5,688,869 | 11/1997 | Sullivan | 525/196 |
| 5,714,546 | 2/1998 | Egashira | 525/221 |

FOREIGN PATENT DOCUMENTS

| | | |
|---|---|---|
| 0407049 | 1/1991 | European Pat. Off. . |
| 0490619 | 6/1992 | European Pat. Off. . |
| 2247682 | 3/1992 | United Kingdom . |
| 2260546 | 4/1993 | United Kingdom . |

*Primary Examiner*—David Buttner
*Attorney, Agent, or Firm*—Sughrue, Mion, Zinn, Macpeak & Seas, PLLC

[57] ABSTRACT

A solid golf ball includes a cover which is mainly formed from a resin blend of (a) 50–90% by weight of a salt of an ethylene-unsaturated carboxylic acid copolymer having an unsaturated carboxylic acid content of 10 to 20% by weight wherein at least 20 mol % of the carboxyl group is neutralized with a metal ion and (b) 50–10% by weight of an ethylene-unsaturated carboxylate-unsaturated carboxylic acid terpolymer having an unsaturated carboxylate content of 12 to 45% by weight and an unsaturated carboxylic acid content of 5.5 to 10% by weight. The cover has a hardness of 60 to 80 on JIS C hardness scale. The golf ball has many advantages including a pleasant feel, ease of spin, ease of control, high repulsion and resistance to peeling.

5 Claims, No Drawings

GOLF BALL

This appln is a continuation of Ser. No. 08/381,392 filed Jan. 31, 1995, abandoned.

BACKGROUND OF THE INVENTION

1. Field of the Invention

This invention relates to a golf ball having improved spin properties, good hitting feel, a satisfactory initial speed, and durability.

2. Prior Art

As the cover material of two-piece golf balls and some wound golf balls, ionomer resins in the form of ethylene-(meth)acrylic acid copolymers are widely used and accepted because of their long-lasting impact resistance and cut resistance. Since the ionomer resins provide hard hitting feel and high hardness as compared with the balata rubber conventionally used as the cover material, golf balls with an ionomer resin cover are said difficult to impart a desired quantity of spin and inferior to control on iron shots.

For improvements in these respects, U.S. Pat. No. 4,884,814 or JP-A 308677/1989 proposes to blend an ionomer resin in the form of an ethylene-(meth)acrylic acid copolymer having a certain spectrum of physical properties with a specific amount of an ethylene-(meth)acrylic acid-(meth)acrylate terpolymer ionomer which is a relatively soft ionomer resin. The soft/hard ionomer blend is used as a golf ball cover. This is a quite effective technique for improving the hitting feel and control of golf balls using a conventional ionomer resin in the form of an ethylene-(meth)acrylic acid copolymer as the cover.

Nevertheless, the golf ball cover of the above-mentioned soft/hard ionomer blend has several problems. Since the cover is softer and has a lower hardness, the cover itself is less repulsive, leading to a golf ball having substantially reduced repulsion. Also the soft ionomer cover allows the ball to receive more spin by an iron shot, which means the increased frictional force between the club face and the cover. Then balls using a hard core such as two-piece solid golf balls have the likelihood that the ball surface be peeled as a consequence of iron shots because the cover surface can be scraped by grooves across the iron club face.

SUMMARY OF THE INVENTION

Therefore, an object of the present invention is to provide good feel, ease of spin, ease of control, high repulsion and resistance to peeling.

Making efforts to develop a golf ball having a soft feel, good spin property, high repulsion, and improved resistance to peeling by iron shots, we have found that when a cover is composed mainly of a resin component consisting essentially of (a) 50 to 90% by weight of an ethylene-unsaturated carboxylic acid copolymer having an unsaturated carboxylic acid content of 10 to 20% by weight, at least 20 mol % of the carboxyl group being neutralized with a metal ion, and (b) 50 to 10% by weight of an ethylene-unsaturated carboxylate-unsaturated carboxylic acid terpolymer having an unsaturated carboxylate content of 12 to 45% by weight and an unsaturated carboxylic acid content of 5.5 to 10% by weight such that the cover has a hardness of 60 to 80 on JIS C scale, there is obtained a golf ball which is unlikely to be peeled on the surface and has a pleasant hitting feel, good spin property and satisfactory initial speed.

Included in the golf ball of the invention are solid golf balls having a solid core enclosed in a cover, for example, two- and three-piece golf balls and wound golf balls having a thread wound core enclosed in a cover. According to the present invention, the cover is composed mainly of a resin component consisting essentially of (a) 50 to 90% by weight of a salt of an ethylene-unsaturated carboxylic acid copolymer having an unsaturated carboxylic acid content of 10 to 20% by weight wherein at least 20 mol % of the carboxyl group is neutralized with a metal ion and (b) 50 to 10% by weight of an ethylene-unsaturated carboxylate-unsaturated carboxylic acid terpolymer having an unsaturated carboxylate content of 12 to 45% by weight and an unsaturated carboxylic acid content of 5.5 to 10% by weight. The cover has a hardness of 60 to 80 on JIS C scale.

DETAILED DESCRIPTION OF THE INVENTION

According to the present invention, the cover of the golf ball is formed of a composition mainly comprising a resin component consisting essentially of (a) a salt of an ethylene-unsaturated carboxylic acid copolymer and (b) an ethylene-unsaturated carboxylate-unsaturated carboxylic acid terpolymer.

Component (a) is a salt of an ethylene-unsaturated carboxylic acid copolymer in which the carboxyl group is neutralized with a metal ion. The unsaturated carboxylic acid is preferably selected from aliphatic mono-carboxylic acids having 3 to 8 carbon atoms, especially acrylic acid and methacrylic acid. The copolymer should have an unsaturated carboxylic acid content of 10 to 20% by weight. With an unsaturated carboxylic acid content of less than 10% by weight, the resulting cover has low impact resilience. With an unsaturated carboxylic acid content of more than 20% by weight, the resulting cover becomes hygroscopic and lowers its performance.

The salts of ethylene-unsaturated carboxylic acid copolymer include sodium, lithium, magnesium and zinc salts. From the standpoints of repulsion and impact durability, it is recommended to combine a monovalent salt (Li or Na salt) with a divalent salt (Mg or Zn salt), especially in a weight ratio of from 25:75 to 75:25. The degree of neutralization with the metal ion (which is the proportion of hydrogen atoms of carboxyl groups in the copolymer replaced by metal ions) is at least 20 mol %, preferably at least 25 mol %. With a degree of neutralization of less than 20 mol %, impact resilience and resistance to peeling are too low to attain the object of the invention.

Typical are ethylene-(meth)acrylic acid copolymer salts which are commercially available as Himilan from Mitsui-DuPont Polychemical K. K., ionomers of the corresponding grade from E. I. DuPont de Nemours Co., and "Iotek" (ethylene-acrylic acid copolymer ionomer) from Exxon.

Component (b) is an ethylene-unsaturated carboxylate-unsaturated carboxylic acid terpolymer. The unsaturated carboxylic acid is preferably selected from carboxylic acids having 3 to 10 carbon atoms, especially unsubstituted mono-carboxylic acids such as acrylic acid and methacrylic acid. The unsaturated carboxylate is preferably selected from esters of unsaturated carboxylic acids having 3 to 8 carbon atoms (e.g., acrylic and methacrylic acid) with alcohols having 1 to 9 carbon atoms. Exemplary esters include methyl acrylate, ethyl acrylate, isobutyl acrylate, n-butyl acrylate, 2-ethylhexyl acrylate, methyl methacrylate, and isobutyl methacrylate.

The terpolymer may be either a random or a graft copolymer. Among the graft copolymers, preference is given to ethylene-(meth)acrylate random copolymers having an unsaturated carboxylic acid graft polymerized thereto.

The terpolymer should have an unsaturated carboxylate content of 12 to 45% by weight, preferably 18 to 25% by weight and an unsaturated carboxylic acid content of 5.5 to 10% by weight, preferably 6 to 9% by weight. If the unsaturated carboxylate content is less than 12% by weight or if the unsaturated carboxylic acid content is more than 10% by weight, the resulting cover is less flexible and has low impact resilience. If the unsaturated carboxylate content is more than 45% by weight or if the unsaturated carboxylic acid content is less than 5.5% by weight, component (b) becomes less compatible with component (a) and the resulting cover has a lower resistance to peeling. If the unsaturated carboxylic acid content is less than 5.5% by weight, the resulting terpolymer is less adhesive to urethane paint which is used as an overcoat. An unsaturated carboxylic acid content of at least 5.5% by weight is necessary in this respect too.

According to the invention, the cover of the golf ball is formed from a composition mainly comprising a resin component consisting essentially of 50 to 90% by weight of component (a) and 50 to 10% by weight of component (b) such that the cover may have a hardness of 60 to 80 on JIS C hardness scale. By blending components (a) and (b) in this range, there can be formed a cover which is soft and resistant to peeling and promotes ball spin. If the content of component (a) is less than 50% by weight or if the cover's hardness is less than 60, the cover is too soft to provide the ball with sufficient repulsion. If the content of component (b) is less than 10% by weight or if the cover's hardness is more than 80, hitting feel and spin property become poor.

In general, the cover is prepared by optionally adding to the resin compound consisting of components (a) and (b) dyes, pigments (e.g., titanium dioxide, zinc oxide and barium sulfate), UV absorbers, anti-oxidants, and dispersing aids (e.g., metal soaps), and mixing these components in a conventional mixing means, for example, a closed kneading machine (Banbury mixer and kneader) and extruder, followed by shaping in a conventional manner.

The core which is enclosed in the cover is not particularly limited and is selected from solid cores for solid golf balls such as two and three-piece golf balls and thread-wound cores. The cover according to the invention exerts its function to the maximum when combined with solid cores having high repulsion.

The solid core of solid golf balls is preferably formed of a composition comprising a base rubber and a metal salt of an unsaturated carboxylic acid. The preferred base rubber used herein is cis-1,4-polybutadiene rubber having at least 90% of a cis structure because of high repulsion. The cis-1,4-polybutadiene rubber may be optionally blended with a suitable amount of natural rubber and polyisoprene rubber although the base rubber should preferably contain at least 80% by weight of high cis-1,4-polybutadiene rubber. If the content of cis-1,4-polybutadiene rubber is less than 80% by weight, the base rubber would not take full advantage of the high repulsion of cis-1,4-polybutadiene rubber. The metal salt of an unsaturated carboxylic acid is blended as a co-crosslinking agent, preferably in an amount of about 25 to 40 parts by weight per 100 parts by weight of the base rubber. A typical salt is zinc acrylate. A peroxide is also added to the core composition. Exemplary peroxides are dicumyl peroxide, t-butylperoxybenzoate, di-t-butylperoxide, and 1,1-bis(t-butylperoxy)-3,3,5-trimethylcyclohexane. The peroxide is preferably blended in an amount of about 0.5 to 3 parts, especially about 0.8 to 2 parts by weight per 100 parts by weight of the base rubber.

In the core composition, there may be blended components conventionally used in the core of two-piece solid golf balls such as zinc oxide, anti-oxidant and barium sulfate, if desired. The core composition is kneaded in a Banbury mixer or kneader and molded and cured into a spherical core by hot pressure vulcanization in a conventional manner. In the practice of the invention, the core as cured preferably has a sufficient hardness to yield a distortion of 2.3 to 3.3 mm when a load of 100 kg is applied to the core. With a core distortion of less than 2.3 mm, a ball obtained by enclosing the core in a cover would be hard and give an unpleasant feel on hitting. A core distortion of more than 3.3 mm would lead to low repulsion.

In the practice of the invention, a golf ball may be prepared by a conventional molding technique, for example, by previously molding half cups from the cover material, interposing a core between the half cups and effecting heat compression molding or by directly enclosing a core with the cover material by injection molding. At the end of such molding, the cover on the surface is subject to finishing steps including buffing, lacquering and stamping.

In the golf ball of the present invention, the cover preferably has a radial thickness of up to 2.2 mm, more preferably 1.2 to 2.1 mm when the ball is a solid golf ball using a solid core as mentioned above. The cover preferably has a radial thickness of up to 2.0 mm, more preferably 1.0 to 1.7 mm when a wound core is used. The ball would lose repulsion more or less if the cover thickness exceeds the above-defined range or upper limit.

EXAMPLE

Examples of the present invention are given below by way of illustration and not by way of limitation.

Examples 1–5 and Comparative Examples 1–6

For the manufacture of a large size two-piece golf ball, a core having a diameter of 38.5 mm was prepared by furnishing a rubber composition of the following formulation and effecting vulcanization at 155° C. for 18 minutes.

| Rubber Composition (Core) | Parts by weight |
| --- | --- |
| JSR BR01 | 100 |
| Zinc acrylate | 33 |
| Zinc oxide | 9.7 |
| Barium sulfate | 9.7 |

-continued

| Rubber Composition (Core) | Parts by weight |
|---|---|
| Anti-oxidant (Nocrack NS-6) | 0.2 |
| Dicumyl peroxide | 1.0 |

Next, a cover composition was prepared by using resin components as shown in Table 1, blending them in the proportion shown in Table 2, and adding 5 parts by weight of titanium dioxide and 0.8 parts by weight of magnesium stearate to 100 parts by weight of the resin components combined. By an injection molding technique, the cover composition was molded over the core to form a cover of 2.0 mm thick thereon. The cover was coated with a urethane base clear lacquer, completing a golf ball.

The two-piece golf balls were evaluated for spin, peeling, hitting feel and initial speed by the following tests.

(1) Hardness

Hardness is expressed by a distortion (mm) of a ball under a load of 100 kg. Higher values indicate softer balls.

(2) Hitting feel

Profession golfers hit balls with the driver (W#1) and 7th iron. A hitting feel was evaluated according to the following criterion.

◯: significantly softer than the feel of conventional two-piece golf balls

Δ: slightly softer than the feel of conventional two-piece golf balls

X: equal to the feel of conventional two-piece golf balls (3) Spin

With a sand wedge mounted on a swing robot, a ball was hit at a head speed of 19 m/s. The motion of the ball immediately after impact was analyzed using high-speed photographs, determining a back spin quantity (rpm).

(4) Initial speed

An initial speed (m/s) was measured by an initial speed meter of the same type as the authorized organization R&A (USGA).

(5) Scuff test

A ball was kept at a temperature of 23° C. Three commercial pitching wedges were mounted on a robot machine. The ball was hit at three positions by the three pitching wedges, once at each position, at a head speed of 37 m/s. The three hit areas were visually observed. Evaluation was made according to the following criterion. The result is an average of four balls tested.

| Point | Remarks |
|---|---|
| 10: | no change on the ball surface |
| 9: | intermediate points 10 and 8 |
| 8: | very slight, substantially unperceivable club face dent |
| 7: | intermediate points 8 and 6 |
| 6: | substantial club face dent, but no peeling from the cover surface |
| 5: | intermediate points 6 and 4 |
| 4: | perceivably peeled surface |
| 3: | intermediate points 4 and 2 |
| 2: | peeled surface with some cracks |
| 1: | outstanding cracks |

(6) Lacquer adhesion

A ball mill was charged with a golf ball, sand as used in the bunker and water and operated. The ball was taken out of the mill and washed and the state of the lacquer coating was observed.

◯: no change of lacquer coating

X: lacquer coating stripped

The results are shown in Table 2.

TABLE 1

| Resin component | Composition | Degree of neutralization (mol %) | Unsaturated carboxylic acid content (wt %) | Ester content |
|---|---|---|---|---|
| Copolymer salt | | | | |
| Ionomer A | ethylene-methacrylic acid (85/15 wt %) copolymer neutralized with Li | 50 | 15 | — |
| Ionomer B | ethylene-methacrylic acid (85/15 wt %) copolymer neutralized with Na | 29 | 15 | — |
| Ionomer C | ethylene-methacrylic acid (85/15 wt %) copolymer neutralized with Mg | 27 | 15 | — |
| Ionomer D | ethylene-methacrylic acid (85/15 wt %) copolymer neutralized with Zn | 58 | 15 | — |
| Terpolymer salt | | | | |
| Ionomer E | ethylene-methacrylic acid-isobutyl acrylate terpolymer neutralized with Na | 70 | 8 | 20 |
| Terpolymer F | ethylene-methacrylic acid - unsaturated carboxylate terpolymer | — | 8 | 20 |
| Terpolymer G | ethylene-methacrylic acid - unsaturated carboxylate terpolymer | — | 4 | 20 |

TABLE 2

|  | Example | | | | | Comparative Example | | | | | |
| --- | --- | --- | --- | --- | --- | --- | --- | --- | --- | --- | --- |
|  | 1 | 2 | 3 | 4 | 5 | 1 | 2 | 3 | 4 | 5 | 6 |
| Resin composition | | | | | | | | | | | |
| Ionomer A | 30 | 35 |  |  | 40 | 47 | 20 |  | 25 | 30 |  |
| Ionomer B |  |  | 30 | 35 |  |  |  | 20 |  |  | 50 |
| Ionomer C | 30 | 35 |  |  | 20 | 47 | 20 |  | 25 | 30 |  |
| Ionomer D |  |  | 30 | 35 |  |  |  | 20 |  |  | 50 |
| Ionomer E |  |  |  |  |  |  |  |  | 50 |  |  |
| Terpolymer F | 40 | 30 | 40 | 30 | 40 | 6 | 60 | 60 |  |  |  |
| Terpolymer G |  |  |  |  |  |  |  |  |  | 40 |  |
| Resin (cover) properties | | | | | | | | | | | |
| JIS C hardness | 75 | 79 | 75 | 79 | 76 | 88 | 58 | 59 | 78 | 76 | 90 |
| Golf ball properties | | | | | | | | | | | |
| Hardness | 2.58 | 2.52 | 2.56 | 2.52 | 2.57 | 2.41 | 2.84 | 2.87 | 2.58 | 2.62 | 2.38 |
| Hitting feel | ○ | ○ | ○ | ○ | ○ | × | ○ | ○ | ○ | ○ | × |
| Spin | 6500 | 6150 | 6450 | 6050 | 6550 | 4510 | 7310 | 7340 | 6200 | 6430 | 3640 |
| Initial speed | 76.6 | 77.0 | 76.7 | 77.1 | 76.8 | 77.3 | 75.7 | 75.5 | 76,.3 | 76.7 | 77.4 |
| Scuff | 8 | 7 | 8 | 8 | 8 | 7 | 3 | 3 | 7 | 5 | 7 |
| Lacquer adhesion | ○ | ○ | ○ | ○ | ○ | ○ | ○ | ○ | ○ | × | ○ |

The golf ball of the invention has many advantages including a pleasant feel, ease of spin, ease of control, high repulsion and resistance to peeling.

Japanese Patent Application No. 6-36521 is incorporated herein by reference.

Although some preferred embodiments have been described, many modifications and variations may be made thereto in the light of the above teachings. It is therefore to be understood that within the scope of the appended claims, the invention may be practiced otherwise than as specifically described.

We claim:

1. A solid golf ball comprising a cover produced from resin components consisting essentially of
   (a) 50 to 70% by weight of a salt of an ethylene-unsaturated carboxylic acid copolymer having an unsaturated carboxylic acid content of 10 to 20% by weight wherein 20 to 50 mol % of the carboxyl group is neutralized with a metal ion, said salt of ethylene-unsaturated carboxylic acid copolymer being a mixture of a monovalent salt and a divalent salt in a weight ratio of from 25:75 to 75:25, and
   (b) 50 to 30% by weight of an ethylene-unsaturated carboxylate-unsaturated carboxylic acid terpolymer having an unsaturated carboxylate content of 12 to 45% by weight and an unsaturated carboxylic acid content of 5.5 to 10% by weight,
   said cover having a hardness of 60 to 80 on JIS C hardness scale.

2. The solid golf ball of claim 1 wherein the unsaturated carboxylic acid of component (a) has 3 to 8 carbon atoms, and the unsaturated carboxylic acid of component (b) has 3 to 10 carbon atoms and the unsaturated carboxylate is an ester of an unsaturated carboxylic acid having 3 to 8 carbon atoms with an alcohol having 1 to 9 carbon atoms.

3. The solid golf ball of claim 2 wherein the unsaturated carboxylic acid of component (a) is acrylic acid or methacrylic, and the unsaturated carboxylic acid of component (b) is acrylic acid or methacrylic acid and the unsaturated carboxylate is methyl(meth)acrylate, ethyl(meth)acrylate, isobutyl(meth)acrylate, n-butyl(meth)acrylate or 2-ethylhexyl(meth)acrylate.

4. The solid golf ball of claim 1 which is a wound golf ball having a thread wound core enclosed in a cover.

5. The solid golf ball of claim 1 which is a two- or three-piece golf ball having a solid core enclosed in a cover.

* * * * *